US005105709A

United States Patent [19]

Suzuki

[11] Patent Number: 5,105,709

[45] Date of Patent: Apr. 21, 1992

[54] ELECTRONIC KEYBOARD MUSICAL INSTRUMENT HAVING USER SELECTABLE DIVISION POINTS

[75] Inventor: Satoshi Suzuki, Hamamatsu, Japan

[73] Assignee: Yamaha Corporation, Hamamastu, Japan

[21] Appl. No.: 470,906

[22] Filed: Jan. 26, 1990

[30] Foreign Application Priority Data

Jan. 27, 1989 [JP] Japan .................................. 1-8698[U]

[51] Int. Cl.[5] ......................... G10H 1/18; G10H 7/00; G09B 15/02

[52] U.S. Cl. ......................................... 84/615; 84/653; 84/478; 84/479 A

[58] Field of Search ................. 84/615, 653, 678, 478, 84/479 A

[56] References Cited

U.S. PATENT DOCUMENTS 4,730,533 3/1988 Schoerkmayr ......................... 84/478
4,957,032 9/1990 Hirano et al. ......................... 84/615
4,957,552 9/1990 Iwase .................................... 84/615
4,991,484 2/1991 Kawashima ........................... 84/615

FOREIGN PATENT DOCUMENTS 61-176598 11/1986 Japan .
62-129896 6/1987 Japan .

*Primary Examiner*—William M. Shoop, Jr.
*Assistant Examiner*—Helen Kim
*Attorney, Agent, or Firm*—Spensley Horn Jubas & Lubitz

[57] ABSTRACT

An electronic keyboard musical instrument has a division point setting switch for setting division point on a keyboard. In the case that the division point setting switch is actuated when all keys are in an off-state or not operated, a division point is set in a predetermined key position. In the case that the division point setting switch is actuated when at least one key is in an on-state or operated, the division point is set in the position of the key which is being operated, thereby setting the division point in the key positions arbitrarily, instead of predetermined key positions.

19 Claims, 5 Drawing Sheets

MAIN ROUTINE

DIVISION-ON SWITCH ON-EVENT PROCESS

DIVISION-POINT SETTING SWITCH ON-EVENT PROCESS

KEY-ON EVENT PROCESS

KEY-OFF EVENT PROCESS

ELECTRONIC KEYBOARD MUSICAL INSTRUMENT HAVING USER SELECTABLE DIVISION POINTS

BACKGROUND OF THE INVENTION

1. Field of the Invention

The present invention relates to an electronic keyboard musical instrument capable of dividing keys into a plurality of key ranges on a keyboard by division points.

2. Prior Art

Conventional electronic keyboard musical instruments have a function by which keys on a keyboard are divided into a low tone group and high tone group, in which the low tone group is used in accompaniment tones and the high tone group is used in melody tones, for example. This type of electronic keyboard musical instrument is disclosed in Japanese Patent Laid-open No. 62-129896. The low tone and high tone groups are divided by a division point which is selected from a plurality of the predetermined points stored in the memory. However, the division point can not be arbitrarily set in the key position on the keyboard to divide the key ranges.

SUMMARY OF THE INVENTION

In consideration of the above described defects, it is an object of the present invention to provide an electronic keyboard musical instrument in which division points can be arbitrarily set at any position in the keys on the keyboard, and can also be set in predetermined key positions.

In an aspect of the present invention, there is provided an electronic keyboard musical instrument comprising: a keyboard having a plurality of keys; first detecting device for detecting operation of the keys and generating key position data corresponding to the operated key; a switch; second detecting device for detecting an operation of the switch; division point setting device for setting a division point in response to the operation of the switch detected by the second detecting device; controlling device for comparing the key position and the division point, and generating musical tone controlling data according to the result of the comparison. The division point setting device sets the division point, in a predetermined key position when only the switch is operated and no key of the keyboard is operated, or in a key position corresponding to the key position data when the switch and at least one of the keys on the keyboard are operated simultaneously.

Accordingly, when only a division point setting switch is actuated, a predetermined point is set as the division point of the keyboard, and when a key and the division point setting switch are simultaneously actuated, the position of the operated key is set as the division point of the keyboard, so that the division point can be set in the arbitrary key positions on the keyboard, and also in the predetermined key positions.

DETAILED DESCRIPTION OF THE PREFERRED EMBODIMENTS

Figure 1:
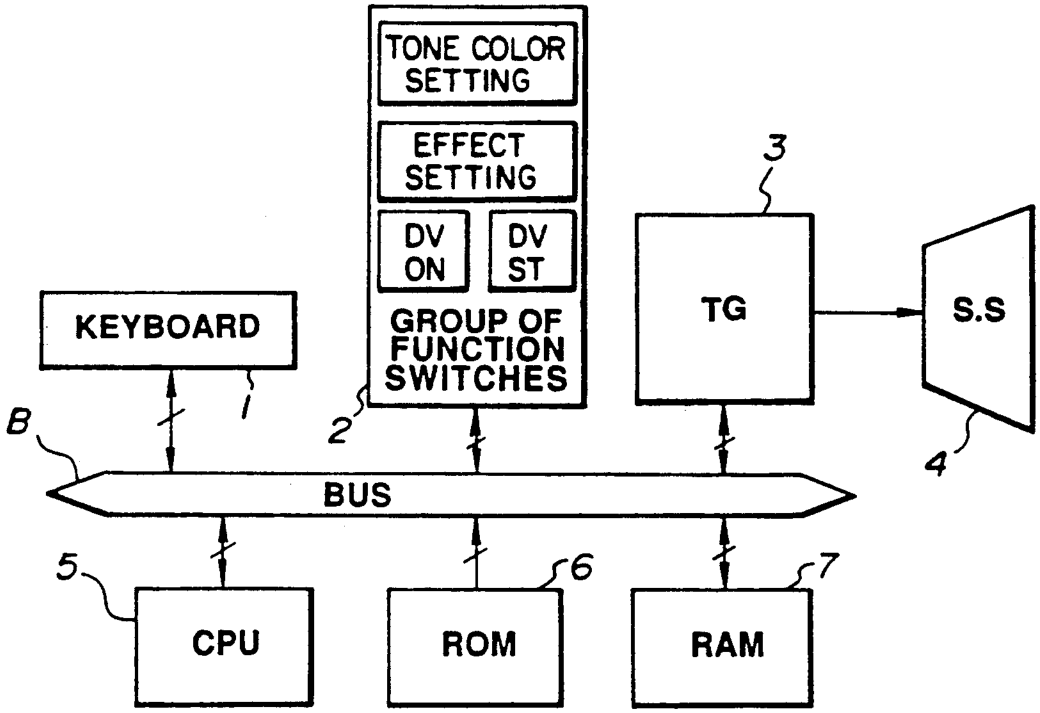
FIG. 1 is a block diagram showing an electronic keyboard musical instrument of an embodiment of the present invention.
Figure 2:
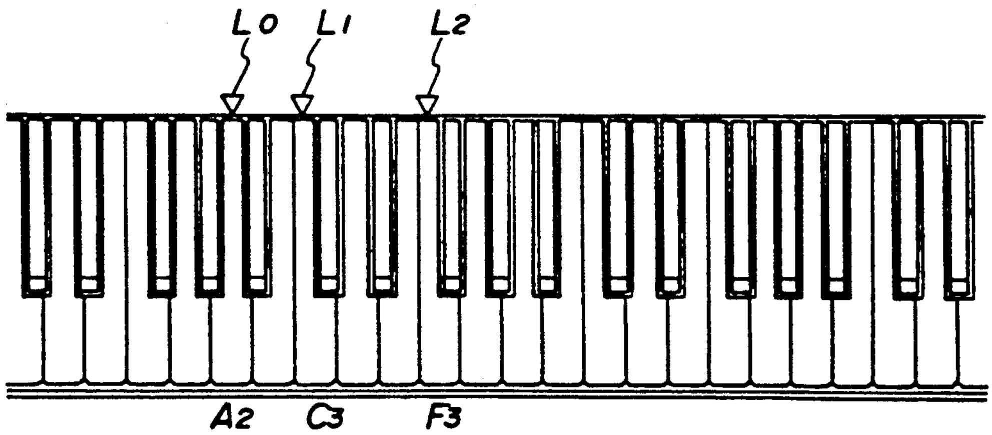
FIG. 2 is a plan view showing a keyboard having division point indicators.

Hereinafter, embodiments of the present invention are described with reference to the drawings. FIG. 1 shows a block diagram of an electronic keyboard musical instrument having a function of the present invention. In this drawing, numeral 1 designates a keyboard having a plurality of keys; a plurality of key-switches for detecting key operation corresponding to the keys; and interface circuits for supplying output signals from each key-switch to a bus line B. The keyboard 1 also has three LED (light emitting diodes) L0 to L2 for indicating division points in the keyboard as shown in FIG. 2. Each division point indicates a boundary key of each key range. Numeral 2 designates a group of function switches comprising a tone color setting switch, an effect setting switch, and also having a division-on switch DVON and a division point setting switch DVST.

The division-on switch DVON is used for turning the key range dividing function by division points on and off. Turning the division-on switch DVON on once divides the keys on keyboard 1 into low tone and high tone side, making different tone colors between musical tones corresponding to the low tone side and the high tone side. In addition, turning the division-on switch DVON on again cancels the divided state of the keys on the keyboard 1, making the same tone color throughout the keys on keyboard 1. Then, each of the keys on keyboard 1 has the same tone color. Accordingly, the key range division by the division points can be either activated or inactivated alternately in response to each operation of the division-on switch DVON.

The division point setting switch DVST is used for setting a division point in a key position on the keyboard so that the keys are divided into the key ranges at that point when the division is activated, the division point indicating the boundary key of the key ranges is changed with sequencing in the order of the LED indicators L0, L1, L2, L0, and the like, at each time when on-operation of the division point setting switch DVST is exist alone. In addition, operating both a key on the keyboard 1 and the division point setting switch DVST simultaneously sets the division point in the operated key position.

Numeral 3 designates a musical tone generator (TG) having a plurality of musical tone generation channels. The musical tone generator 3 mixes musical tone signals obtained from the musical tone generation channels to output the mixed musical tone signal to sound system 4. The sound system 4 converts the musical tone signals supplied from musical tone generator 3 into musical tones to generate sound therefrom.

Numeral 5 designates a CPU (central processing unit) which controls each component of the electronic keyboard musical instrument through bus line B. Numeral 6 designates a ROM which stores control programs and fixed data. The ROM 6 stores the following data:

LPD: low point data which is a key-code corresponding to a key indicated by LED indicator L0.

MPD: middle point data which is a key-code corresponding to a key indicated by LED indicator L1.

UPD: upper point data which is a key-code corresponding to a key indicated by LED indicator L1.

Numeral 7 designates a RAM for storing data. The RAM 7 has the following registers:

NTD: normal-tone data register which stores tone color data in the case that the range of keys is not divided by a division point.

UTD: upper-tone data register which stores tone color data of the high tone side divided by a division point.

LTD: lower-tone data register which stores tone color data of the low tone side divided by a division point.

DON: division-on register which is set to "1" in the case of that range of keys is divided by a division point, otherwise which is set to "0".

DMD: division-mode register which stores the division mode which indicates dividing condition as the following:

When DMD=0, a division point is the position of LED indicator L0 (see FIG. 2).

When DMD=1, a division point is the position of LED indicator L1 (see FIG. 2).

When DMD=2, a division point is the position of LED indicator L2 (see FIG. 2).

When DMD=3, a division point is the position selected by the key of the keyboard.

DPD: division-point register which stores a key-code of a division point.

KON: key-on register which is set to "1" when any key is depressed.

KCD: key-code register which is set to a key-code of a depressed on key.

KBUF: key-buffer register which is set to a key-code of a released key.

TD: tone data register which is set by tone color data.

According to the construction of the electronic keyboard musical instrument stated above, the operation is described with reference to FIG. 3 to FIG. 7 hereinafter. Each of the FIGS. 3 to 7 shows a flow chart executed by CPU 5.

Figure 3:
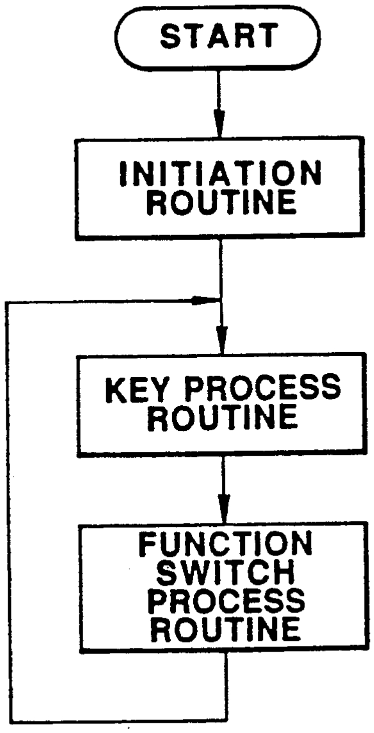
FIG. 3 is a flow chart showing a main routine.

FIG. 3 shows a main processing routine. Turning a power source on starts the main processing routine. At first, an initiation routine is executed to clear registers in musical tone generator 3, registers in RAM 7, and the like. A key process routine then executes to examine key states for each key, that is, whether each key is in an On or Off-state. If a key being On-state newly is detected, that is, a key-on event is detected, a key-on process is executed in accordance with a routine shown in FIG. 6. If a key being Off-state newly is detected, that is, a key-off event is detected, a key-off process is executed in accordance with a routine shown in FIG. 7. The process then moves to a function switch process routine. The routine executes to examine the state of each switch of the function switches 2, that is, whether the switch is in an On or Off-state. If an on-event of the division-on switch DVON is detected, a division-on switch process is executed in accordance with a routine shown in FIG. 4. If an on-event of the division point setting switch DVST is detected, a division setting switch on-event process is executed in accordance with a routine shown in FIG. 5. On the other hand, when the tone color setting switch, or the like is operated newly, a routine corresponding to the switch is executed. A detailed description of the routine is omitted. After executing the function switch process, the process returns to the key process routine to repeat the key process and the function switch process.

The following descriptions are related to the division-on switch on-event process, division setting switch on-event process, key-on event process, and key-off event process.

Figure 4:
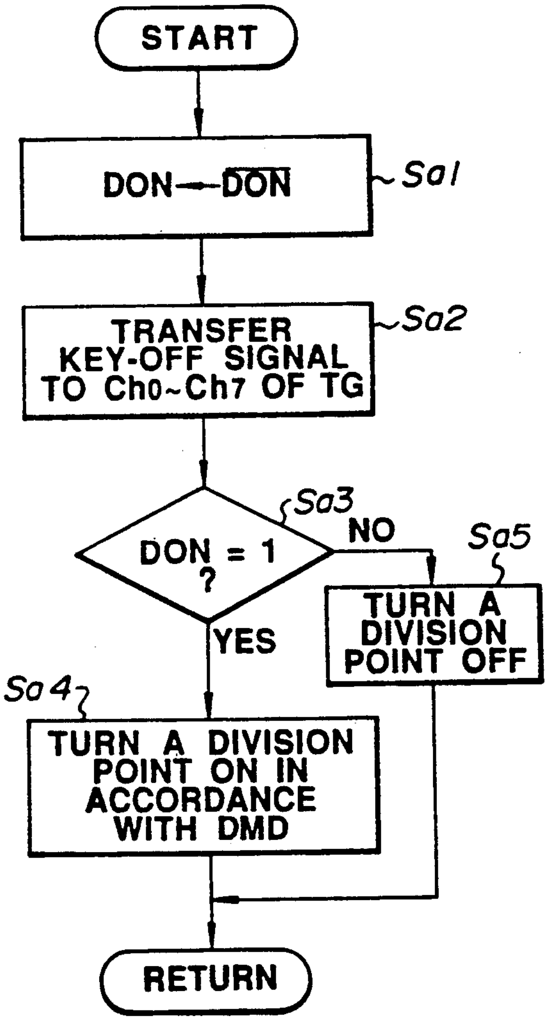
FIG. 4 is a flow chart showing a routine of the split-on switch process.

(1) Division-on switch on-event process (referring to FIG. 4)

When the division-on switch DVON is turned on, the division-on switch on-event process is executed.

In step Sa1, data in the division-on register DON of RAM 7 is inverted, and the process then moves to step Sa2.

In step Sa2, a key-off signal is supplied to the channels of No. 0 to No. 7 in musical tone generator 3. This is a process so that the musical tone generated by the previous mode is stopped when the previous mode is changed into another other mode. If this process is omitted, the generation of the musical tone by the previous mode remains until the key corresponding to the musical tone is released. Supplying the key-off signal to the channels stops generating all musical tones. The process then moves to step Sa3.

In step Sa3, the process examines whether the value of the division-on register DON is equal to "1" or not. If the decision is "yes", the process moves to step Sa4, otherwise it moves to step Sa5.

In step Sa4, one of the LED indicators L0 to L2 indicated by the division-mode register DMD is turned on, that is, a division point is indicated on the keyboard. The process then returns to the main routine. However, if the value of the division-mode register DMD is "3", none of the LED indicators L0 to L2 is turned on.

In step Sa5, all of the LED indicators L0 to L2 are turned on is turned off. The process then returns to the main routine.

Figure 5:
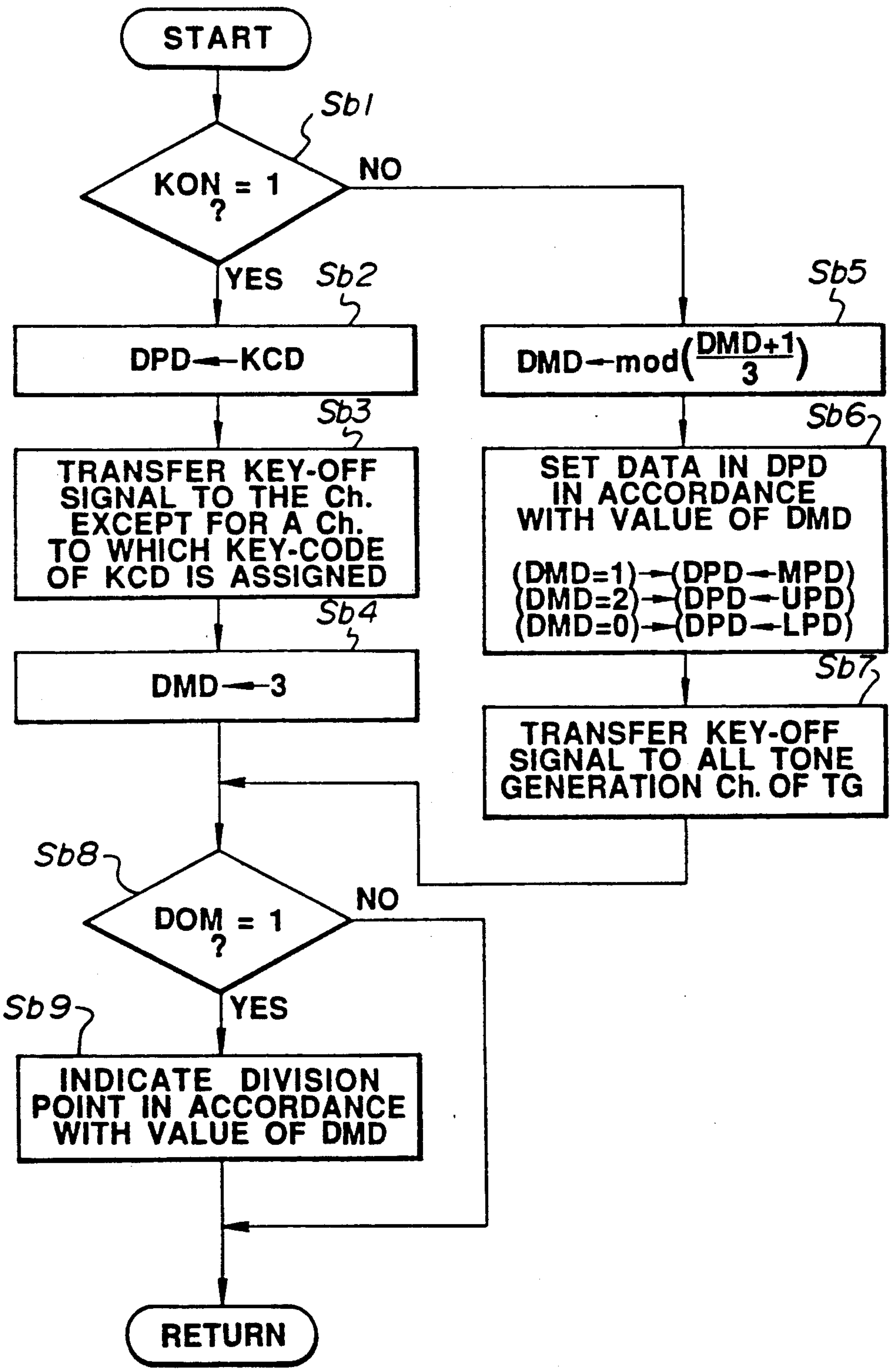
FIG. 5 is a flow chart showing a routine of the split-setting switch process.

(2) division-point setting switch on-event process (referring to FIG. 5)

When the division setting switch on-event DVST is turned on, the division setting switch on-event process is executed.

In step Sb1, the process examines whether the value of the key-on register KON is equal to "1" or not. If the result is "yes", that is, at least one of the keys is already in an on-state when the division setting switch DVST is turned on, the process moves to step Sb2, otherwise it moves to step Sb5.

In step Sb2, a key-code in the key-code register KCD is written into the division point register DPD. The process then moves to step Sb3. In this case the key-code was written into the key-code register KCD when the last key was depressed (referring to step Sc1 of FIG. 6).

In step Sb3, key-off signals are supplied to channels, except for a channel to which in musical tone generator 3 stored in the key-code register KCD is assigned, so that generation of other musical tones is stopped, except for the key-codes stored in the key-code register KCD. The process then moves to step Sb4. In this case the process of step Sb3 can be omitted as well as the process of step Sa2 described above.

In step Sb4, "3" is set in the division-mode register DMD. The process then moves to step Sb8.

In the case of step Sb5, that is, a key being in an On-state is not present when the division setting switch DVST turns on, "1" is added to data stored in the division-mode register DMD. The value of the division-mode register DMD is then divided by "3" and the remainder of this result is written into the division-mode register DMD. The process then moves to step Sb6. Therefore, the relation between the previous state and the new state of the division-mode register DMD is as follows:

| Old DMD | New DMD |
|---|---|
| 0 | 1 |
| 1 | 2 |
| 2 | 0 |
| 3 | 1 |

In step Sb6, next fixed data stored in ROM 6 is written into the division-point register DPD in accordance with data stored in the division-mode register DMD. The process then moves to step Sb7. The relation between the DMD and the DPD as follows:

| DMD | DPD |
|---|---|
| 0 | LPD |
| 1 | MPD |
| 2 | UPD |

In step Sb7, a key-off signal is supplied to all channels of musical tone generator 3, so that generation of all musical tones is stopped. The process then moves to step Sb8. This process can be omitted as well as that of step Sa2.

In step Sb8, the process examines whether the value of the split-on register SON is equal to "1" or not. If the result is "yes", the process moves to step Sb9, otherwise it returns to the main routine.

In step Sb9, one of LED indicators L0 to L2 indicated by the division-mode register DMD is turned on, that is, a division point can be seen on the keyboard. However, in the case that the division-mode register DMD is equal to "3", none of LED indicators L0 to L2 is turned on. The process then returns to the main routine.

Figure 6:
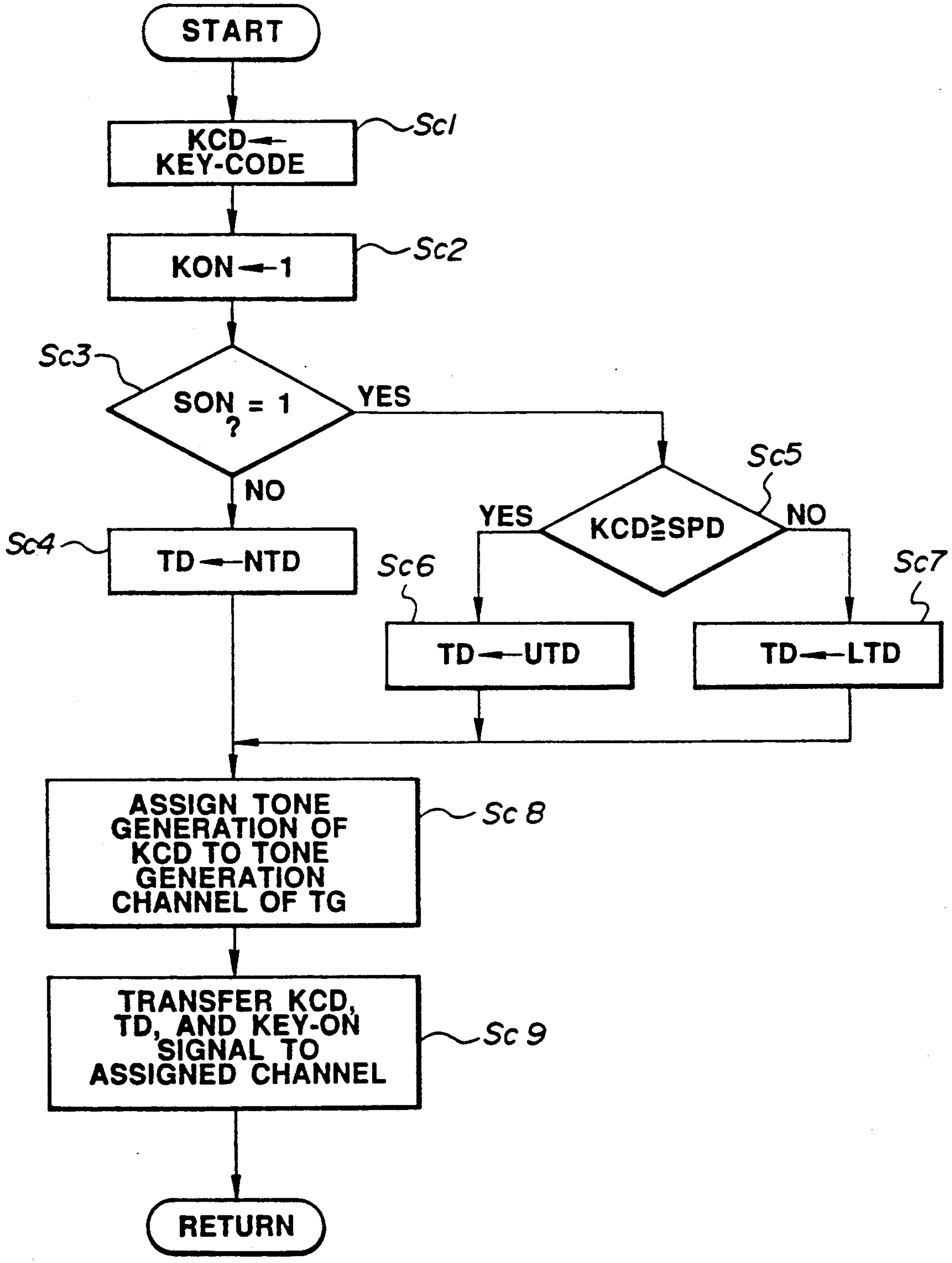
FIG. 6 is a flow chart showing a routine of the key-on event process.

(3) Key-on event process (referring to FIG. 6)

When one of the keys is depressed, the key-on event process is executed.

In step Sc1, a key-code of the depressed key is written into the key-code register KCD in RAM 7. The process then moves to step Sc2.

In step Sc2, "1" is set in the key-on register KON. The process then moves to step Sc3.

In step Sc3, the process examines whether the value of the division-on register DON is equal to "1" or not. If the result is "no", that is, the division of the keys is not executed, the process moves to step Sc4, otherwise it moves to step Sc5 to execute the division of the keys.

In step Sc4, tone color data stored in the normal-tone data register NTD is written into the tone data register TD, both the registers being present in RAM 7.

In step Sc5, the process examines whether a key-code of the key-code register KCD is greater than or equal to that of the division-point register DPD or not. If the result is "yes", the process moves to step Sc6, otherwise it moves to step Sc7.

In step Sc6, tone color data stored in the upper-tone data register UTD of RAM 7 is written into the tone-data register TD. The process then moves to step Sc8.

In step Sc7, tone color data stored in the lower-tone data register LTD is written into the tone-data register TD. The process then moves to step Sc8.

In step Sc8, the key-code stored in the key-code register KCD for generating musical tones is assigned to one of the musical tone generation channels of musical tone generator 3. The process then moves to step Sc9.

In step Sc9, each of the key-code stored in the key-code register KCD, tone color data stored in the tone-data register TD, and key-on signal is transferred to the assigned channel, thereby generating a musical tone having the tone color indicated by tone color data of the tone-data register TD, in which the musical tone has a tone pitch corresponding to the depressed key.

Figure 7:
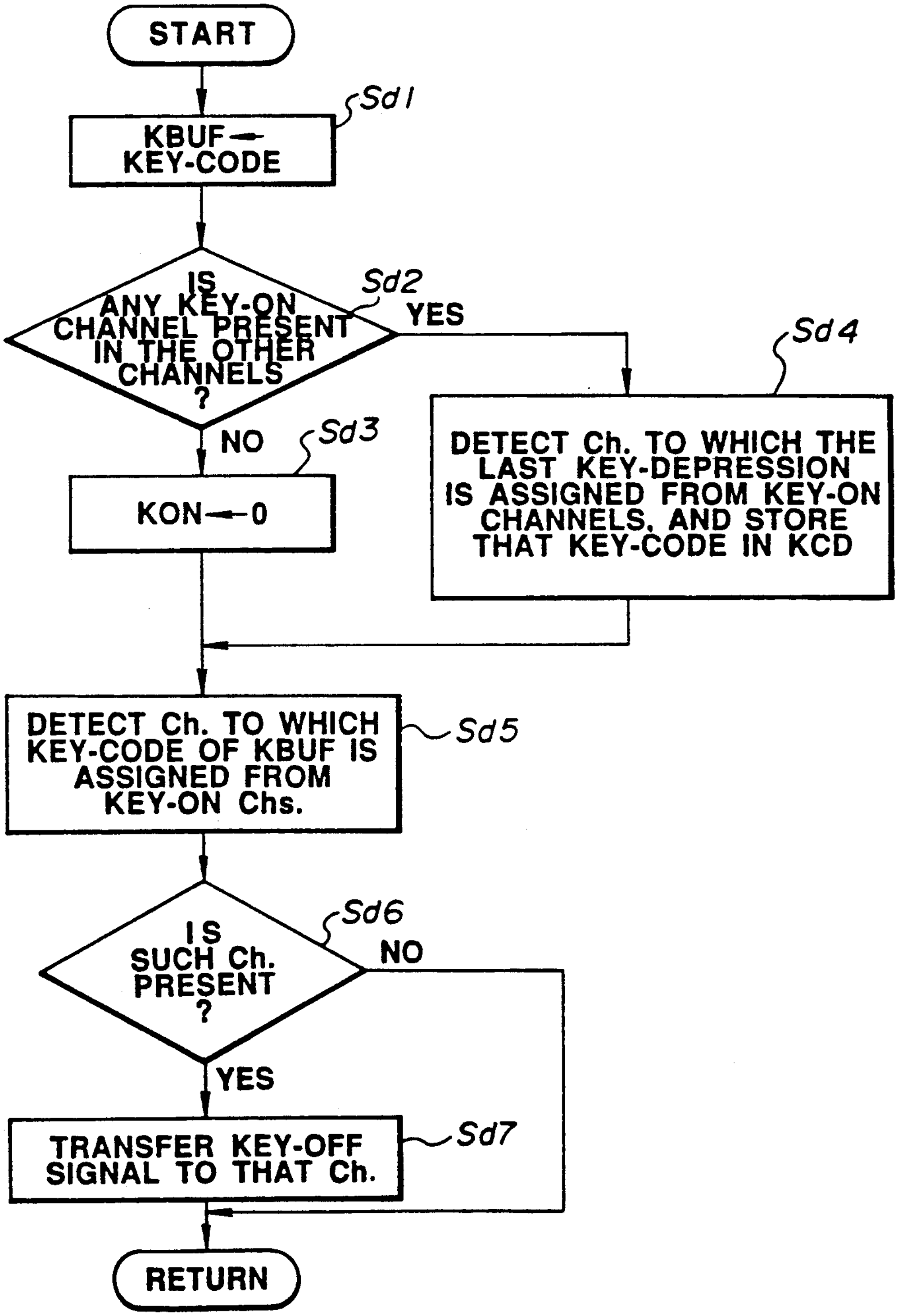
FIG. 7 is a flow chart showing a routine of the key-off event process.

(4) Key-off event process (referring to FIG. 7)

When one of the keys is released, the key-off event process is executed.

In step Sd1, a key-code of the released key is written into the key-buffer register KBUF. The process then moves to step Sd2.

In step Sd2, the process examines whether any on-channel is present, which is in generation of musical tones, or not, except that the channel which is assigned to the released key of off-state. If the decision is "no", the process moves to step Sd3, otherwise it moves to step Sd4.

In step Sd3, "0" is set in the key-on register KON. The process then moves to step Sd5.

In step Sd4, a channel corresponding to the last depressed key is detected from on-channels of tone generator 3, and the key-code which is assigned to the channel is written into the key-code register KCD. The process then moves to step Sd5. The step Sd4 is a process which is necessary for the operation of the division setting switch DVST after this key-off event process.

In step Sd5, a channel assigned to a key-code stored in the key-buffer register KBUF is detected. The process then moves to step Sd6.

In step Sd6, the process examines whether a channel is present or not. If the result is "yes", the process moves to step Sd7, otherwise it returns to the main routine, that is, in the case that tone color of the released key is a decay tone color such as a percussive tone color, and the musical tone generation is already finished at the time when the key is released. The process then returns to the main routine.

In step Sd7, a key-off signal is transferred to the detected channel, so that generation of the musical tone corresponding to the key which is released is stopped. The process then returns to the main routine.

Accordingly, in the case that the division point setting switch is operated, when all keys of keyboard 1 are in an off-state or not operated, a division point is set in a predetermined key position. While in the case that the division point setting switch is operated, when at least one of the keys is in an on-state, the division point is set in the position of the key which is in an On-state, so that the division point can be arbitrarily set in the key positions instead of the predetermined position on the keyboard.

The preferred embodiment described herein is illustrative and not restrictive; the scope of the invention is indicated by the appended claims and all variations which fall within the claims are intended to be embraced therein.

What is claimed is:

1. An electronic keyboard musical instrument comprising:

a keyboard having a plurality of keys;

first detecting means for detecting operation of said keys and generating key position data corresponding to the operated key;

a switch;

second detecting means for detecting an operation of said switch;

division point setting means for setting a division point in response to the operation of said switch detected by said second detecting means;

controlling means for comparing said key position and said division point, and generating musical tone controlling data according to the result of the comparison; and wherein said division point setting means sets said division point in a predetermined key position when only said switch is operated, or in a key position corresponding to said key position data when said switch is operated together with at least one of said keys on the keyboard.

2. An electronic keyboard instrument according to claim 1, wherein said predetermined key position is selected from a plurality of predetermined key positions.

3. An electronic keyboard instrument according to claim 1, wherein said key position data which is selected is position data of a key operated at the last operation.

4. An electronic keyboard instrument according to claim 1, further comprising an indicator for indicating a division point to a player.

5. An electronic keyboard instrument according to claim 1, further comprising a division switch for turning On and Off a state of division.

6. An electronic keyboard musical instrument according to claim 1, wherein said musical tone control data includes accompaniment data, and wherein lower keys from said division point are used to generate accompaniment tones.

7. An electronic keyboard musical instrument according to claim 1, wherein said musical tone control data includes accompaniment data, and wherein upper keys from said division point are used to generate melody tones.

8. An electronic keyboard musical instrument according to claim 1, wherein said musical tone control data include tone color data, and wherein different tone colors are respectively set to upper keys and lower keys from said division point.

9. A musical tone control apparatus having a reference data setting function comprising:

a selectively operable generating means for generating first predetermined data;

a selectively operable switch means;

storing means for storing second predetermined data;

reference data setting means for setting said second predetermined data as said reference data when only said switch means is selectively operated, and setting said first predetermined data as said reference data when said data generating means and said switch means are selectively operated together; and controlling means for controlling a musical tone based on said reference data.

10. A musical tone control apparatus having a reference data setting function according to claim 9, wherein said first predetermined data is selectable pitch data representing a desirable tone pitch.

11. A musical tone control apparatus having a reference data setting function according to claim 10, wherein said selectively operable generating means is a keyboard having a plurality of keys, wherein at least one of said keys is operable to generate said pitch data.

12. A musical tone control apparatus having a reference data setting function according to claim 10, wherein said second predetermined data is predetermined pitch data representing a certain tone pitch, and wherein said controlling means controls tone color of a musical tone based on said selectable pitch data or said predetermined pitch data.

13. A musical tone control apparatus having a reference data setting function according to claim 9, wherein said reference data setting means comprises means for determining a state of operation of said data generating means when said switch means is operated.

14. A musical tone control apparatus having a reference data setting function comprising:

a selectively operable generating means for generating first predetermined data;

a selectively operable switch means;

storing means for storing second predetermined data;

reference data setting means for setting said second predetermined data as said reference data when said switch means is selectively operated, and setting said first predetermined data as said reference data when said data generating means and said switch means are selectively operated; and controlling means for controlling a musical tone based on said reference data, wherein said controlling means includes means for comparing said first predetermined data with said reference data and controlling a musical tone based on a result of said comparison.

15. A musical tone control apparatus having a reference data setting function according to claim 14, wherein said reference data setting means includes register means for storing said reference data, wherein said comparing means compares said first predetermined data with said reference data stored in said register means.

16. A musical tone control apparatus having a reference data setting function comprising:

a selectively operable generating means for generating first predetermined data, said first predetermined data being selectable pitch data representing a desirable tone pitch and said selectively operable generating means being a keyboard having a plurality of keys wherein at least one of said keys is operated to generate said pitch data;

a selectively operable switch means;

storing means for storing second predetermined data;

reference data setting means for setting said second predetermined data as said reference data when said switch means is selectively operated, and setting said first predetermined data as said reference data when said data generating means and said switch means are selectively operated;

controlling means for controlling a musical tone based on said reference data; and indication means for indicating a division point in said keyboard.

17. A musical tone control apparatus having a reference data setting function comprising:

a selectively operable generating means for generating first predetermined data;

a selectively operable switch means;

storing means for storing second predetermined data;

reference data setting means for setting said second predetermined data as said reference data when said switch means is selectively operated, and setting said first predetermined data as said reference data when said data generating means and said switch means are selectively operated;

controlling means for controlling a musical tone based on said reference data; and means for switching between a first operating state where said controlling means controls a musical tone utilizing said reference data and a second operating state where said controlling means controls a musical tone without utilizing said reference data.

18. A musical tone control apparatus having a reference data setting function comprising:

a selectively operable generating means for generating first predetermined data;

a selectively operable switch means;

storing means for storing second predetermined data;

reference data setting means for setting said second predetermined data as said reference data when said switch means is selectively operated, and setting said first predetermined data as said reference data when said data generating means and said switch means are selectively operated; and controlling means for controlling a musical tone based on said reference data, wherein said storing means stores third predetermined data, said reference point setting means repeatedly setting said third predetermined data and said second predetermined data when only said switch means is operated.

19. A musical tone control apparatus having a reference data setting function comprising:

a selectively operable generating means for generating first predetermined data;

a selectively operable switch means;

storing means for storing second predetermined data;

reference data setting means for setting said second predetermined data as said reference data when said switch means is selectively operated, and setting said first predetermined data as said reference data when said data generating means and said switch means are selectively operated; and controlling means for controlling a musical tone based on said reference data; and register means for storing said first predetermined data last generated from said data generating means, said reference data setting means setting said first predetermined data stored in said register means as said reference data when both said data generating means and said switch means are operated.

* * * * *